US012759262B2

(12) United States Patent
Bayona P. et al.

(10) Patent No.: US 12,759,262 B2
(45) Date of Patent: Oct. 13, 2026

(54) BOPP FILM AND METHOD OF MAKING THE SAME

(71) Applicant: Inteplast Group Corporation, Livingston, NJ (US)

(72) Inventors: Rafael E. Bayona P., Morristown, TN (US); Kiran Jayantilal Soneji, Morristown, TN (US)

(73) Assignee: Inteplast Group Corporation, Livingston, NJ (US)

( * ) Notice: Subject to any disclaimer, the term of this patent is extended or adjusted under 35 U.S.C. 154(b) by 190 days.

(21) Appl. No.: 18/075,017

(22) Filed: Dec. 5, 2022

(65) Prior Publication Data

US 2023/0173787 A1 Jun. 8, 2023

Related U.S. Application Data

(60) Provisional application No. 63/285,732, filed on Dec. 3, 2021.

(51) Int. Cl.

*B32B 7/02* (2019.01)
*B32B 5/18* (2006.01)

(Continued)

(52) U.S. Cl.

CPC .................. *B32B 7/02* (2013.01); *B32B 5/18* (2013.01); *B32B 5/32* (2013.01); *B32B 7/12* (2013.01); *B32B 27/065* (2013.01); *B32B 27/08* (2013.01); *B32B 27/16* (2013.01); *B32B 27/18* (2013.01); *B32B 27/32* (2013.01);

(Continued)

(58) Field of Classification Search

CPC .... B32B 7/02; B32B 5/18; B32B 5/32; B32B 7/12; B32B 27/065; B32B 27/08; B32B 27/16; B32B 27/18; B32B 27/32; B32B 2264/1059; B32B 2264/1054; B32B 2250/05; B32B 2264/0285; B32B 2307/406; B32B 2307/41; B32B 2307/518; B32B 2307/732; B32B 2519/00

See application file for complete search history.

(56) References Cited

U.S. PATENT DOCUMENTS

| | | | |
|---|---|---|---|
| 4,377,616 | A | 3/1983 | Ashcraft et al. |
| 4,632,869 | A | 12/1986 | Park et al. |
| 4,758,462 | A | 7/1988 | Park et al. |
| 4,767,675 | A | 8/1988 | Cyr et al. |
| 5,492,757 | A | 2/1996 | Schuhmann et al. |
| 5,945,205 | A | 8/1999 | Keller et al. |
| 8,124,243 | B2 | 2/2012 | Wright et al. |

(Continued)

FOREIGN PATENT DOCUMENTS

WO 2017180635 A1 10/2017

*Primary Examiner* — Alicia J Weydemeyer
*Assistant Examiner* — Laura B Figg
(74) *Attorney, Agent, or Firm* — Lerner David LLP

(57) ABSTRACT

Multi-layer films and labels are disclosed herein. In an embodiment, a multi-layer film comprises a first skin layer, a first intermediate layer, a core layer, a second intermediate layer, and a second skin layer arranged sequentially, wherein the core layer has a thickness that is greater than thickness of the first or the second intermediate layers or the skin layer, wherein the core layer includes polybutylene terephthalate (PBT) particles disposed therein, wherein the amount of PBT particles ranges from about 5 to about 10 percent by weight (wt %), based on the total weight of the core layer, wherein the multi-layer film has a thickness ranging from about 25 microns to about 45 microns, wherein the core layer has a thickness ranging from about 20 microns to about 40 microns.

20 Claims, 3 Drawing Sheets

(51) Int. Cl.

| | |
|---|---|
| ***B32B 5/32*** | (2006.01) |
| ***B32B 7/12*** | (2006.01) |
| ***B32B 27/06*** | (2006.01) |
| ***B32B 27/08*** | (2006.01) |
| ***B32B 27/16*** | (2006.01) |
| ***B32B 27/18*** | (2006.01) |
| ***B32B 27/32*** | (2006.01) |

(52) U.S. Cl.

CPC ... *B32B 2250/05* (2013.01); *B32B 2264/0285* (2013.01); *B32B 2264/1054* (2020.08); *B32B 2264/1059* (2020.08); *B32B 2307/406* (2013.01); *B32B 2307/41* (2013.01); *B32B 2307/518* (2013.01); *B32B 2307/732* (2013.01); *B32B 2519/00* (2013.01)

(56) References Cited

U.S. PATENT DOCUMENTS

| | | | | |
|---|---|---|---|---|
| 2003/0211298 | A1* | 11/2003 | Migliorini | B32B 27/08 264/510 |
| 2004/0219321 | A1 | 11/2004 | Squier et al. | |
| 2006/0024520 | A1 | 2/2006 | Kong et al. | |
| 2009/0297820 | A1 | 12/2009 | Kovalchuk et al. | |
| 2016/0108191 | A1 | 4/2016 | Li et al. | |
| 2018/0333935 | A1* | 11/2018 | Marchal | B32B 7/12 |
| 2018/0361722 | A1* | 12/2018 | Ambroise | B32B 27/302 |
| 2019/0375200 | A1* | 12/2019 | Kitada | B32B 27/308 |
| 2020/0376819 | A1* | 12/2020 | Bayona P | B32B 27/205 |

* cited by examiner

BOPP FILM AND METHOD OF MAKING THE SAME

CROSS-REFERENCE TO RELATED APPLICATION

The present disclosure claims priority from U.S. Provisional Patent Application No. 63/285,732, the contents of which are incorporated by reference herein.

FIELD OF THE INVENTION

The present disclosure relates generally to the field of three, five or seven multilayer biaxially oriented polypropylene (BOPP) films and label applications.

BACKGROUND

Cavitation in BOPP films is a technique known in the art. The cavitation or voiding is achieved by using non compatible agents i.e. inorganics earths like $CaCO_3$, $SiO_2$, $TiO_2$, Talcum or organic materials like polybutylene terephthalate (PBT), PMMA, PA6, blended in polypropylene matrix and using a biaxially stretching process. Usually the cavitation agent is added to the core or any subsequent layer of a BOPP film to reduce overall unit weight, which translates in a higher yield of area per unit weight for the users of the film giving a higher number of packages or labels per unit weight. The core layer of a BOPP film is usually the thickest layer of the film and would result in the most improvement in yield during manufacturing, but also it will be discussed the use of cavitating agents in the subjacent layers to the core. On the other side, the use of cavitating agent reduce other physical properties of the BOPP film, such as the modulus and craze resistance. In some cases, such as in BOPP films used in packaging, this effect is desirable because the packaging is designed to be torn and easily removed from the article, such as a candy bar or other article wrapped in disposable packaging. However, in label applications, the reduction of such properties like modulus or high z tear interfacial layers force created by cavitation is undesirable.

Moreover, it is desired for the label to have a high glossy solid color finish. Cavitation introduces a pearlescent finish to the film due to the diffraction of the light on the surface of the particles used as cavitating agents. As used herein, 'pearlescent' is understood to mean 'having a luster resembling that of mother-of-pearl'. For example, cavitation may cause an otherwise solid glossy white film to appear as having multi-colored luster that is consistent with mother-of-pearl. Typically, pearlescent is based on customer preference on the appearance of the film.

The use of cavitating agents introduces a rough surface of the layer where it is included. This roughness is usually followed by the adjacent layers. This effect reduces the reflection of the light on the film reducing the gloss of the film. For example, the cavitation agent can create 'bumps' on the surface of the core which can be translated through successive layers disposed on the core to the surface of the label, making the surface of the label rough. As a general request in the market the surface of the label, should have a smooth glossy surface to be printed and/or coated.

In view of the foregoing, there is a need in the art for BOPP films for label application that use cavitation agents and which have improved appearance and mechanical properties.

BRIEF SUMMARY

Multi-layer films and labels are disclosed herein.

In some embodiments, a multi-layer film includes a core layer having a first side and a second side opposite the first side, wherein the core layer comprises a polymer, a first intermediate layer disposed on the first side of the core layer, a second intermediate layer disposed on the second side of the core layer, a first skin layer disposed on the first intermediate layer and arranged such that the first intermediate layer is disposed between the core layer and the first skin layer, and a second skin layer disposed on the second intermediate layer and arranged such that the second intermediate layer is disposed between the core layer and the second skin layer, wherein the core layer has a thickness that is greater than thickness of the first or the second intermediate layers or the skin layer, wherein the core layer includes polybutylene terephthalate (PBT) particles disposed therein, wherein the amount of PBT particles ranges from about 5 to about 10 percent by weight (wt %), based on the total weight of the core layer, wherein the multi-layer film has a thickness ranging from about 25 microns to about 45 microns, wherein the core layer has a thickness ranging from about 20 microns to about 40 microns.

In some embodiments, the multi-layer film has a thickness ranging from about 35 microns to about 38 microns.

In some embodiments, the core layer has a thickness ranging from about 28 microns to about 32 microns.

DETAILED DESCRIPTION

The following detailed description of BOPP films refers to the accompanying drawings that illustrate exemplary embodiments consistent with these films. Other embodiments are possible, and modifications may be made to the embodiments within the spirit and scope of the methods and systems presented herein. Therefore, the following detailed description is not meant to limit the films described herein. Rather, the scope of these devices is defined by the appended claims. The BOPP films discussed herein advantageously have low unit weight (weight/unit area), high yield (area/unit weight), high smooth surface, e.g., results in a glossy appearance, high modulus, e.g., stiffness, and high z tear interfacial layer force. It has been unexpected discovered that when polybutylene terephthalate (PBT) is used as a cavitating agent in the core layer of a BOPP film having an overall thickness of about 45 microns or less, more preferably about 40 microns or less, most preferably about 38 microns or less, an improved high z tear interfacial layer force is realized. Exemplary BOPP film application that may benefit from improved high z tear interfacial layer force include pressure sensitive labels (PSALs) and roll fed labels (RFLs).

Z tear measurements herein are made using a 1 inch wide sample. Double sided polyvinyl chloride (PVC) tape is attached to one size of the sample and Scotch 610 tape (available from 3M) is attached to the opposite side of the sample. The sample is pulled at a 45 degree angle at 1200 in/min speed for separation. The apparatus and method used to perform the Z tear method can be found in "The Chem Instruments EZ data". In some embodiments, Z tear using PBT particles in the core layer can range from about 422 Win to about 1180 Win. When $CaCO_3$ particles are used in the core layer, Z tear can range from about 403 Win to about 997 Win.

Figure 1A:
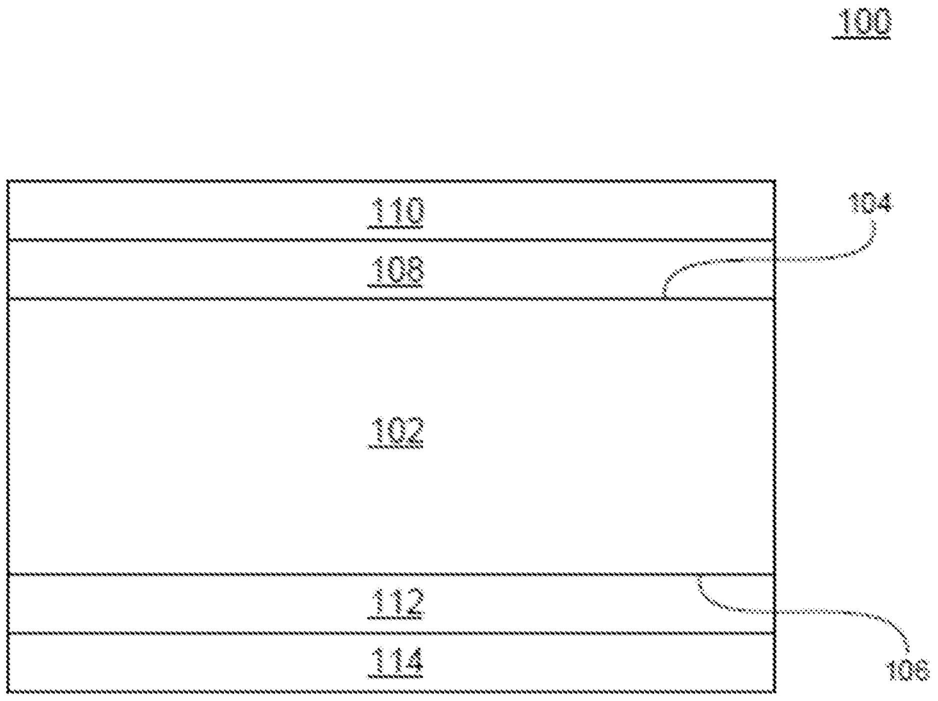
FIG. 1A illustrates a cross-section of a multi-layer film in accordance with an embodiment of the present disclosure.

FIG. 1A illustrates a cross-section of a multi-layer film 100 in accordance with an embodiment of the present disclosure. The multi-layer film 100 includes a polymer-based core layer 102. The polymer-based core layer 102 has a first surface 104 and an opposing second surface 106. The polymer-based core layer 102 functions to provide the multi-layer film 100 with mechanical properties, such as stiffness, tensile strength, modulus and opacity. The films discloses herein have an gloss, measured by ASTM D2457 at an angle of 45°, ranging from about 60 to about 80, or from about 60 to about 70. The films have an opacity, measured by TAPPI T425, of about 80 to about 90, or about 83 to about 90, or about 85 to about 90, or about 90 or greater. The multi-layer film 100 may have a thickness of about 45 microns or less, or about 40 microns to about 45 microns, or about 35 microns to about 40 microns, or about 35 microns to about 38 microns, or about 30 microns to about 35 microns, or about 25 microns to about 30 microns.

The polymer-based core layer 102 may range in thickness from about 10 micrometers (μm) to about 40 μm, or about 20 μm to about 35 μm, or about 28 μm to about 32 μm.

The polymer-based core layer 102 comprises a polymer such as polypropylene. The polypropylene can be a homopolymer with either high or standard crystallinity. The polymer may be present in the core layer 102 in an amount of greater than about 50 weight %, based on the total weight of the core layer. In some embodiments, the polymer may be present in an amount ranging from about 50 wt % to about 95 wt %, or about 70 wt % to about 95 wt %, or about 75 wt % to about 95 wt %, or about 80 wt % to about 95 wt %, or about 85 wt % to about 95 wt %, or about 90 wt % to about 95 wt %, based on the total weight of the core layer. The core layer 102 includes first particles. In one embodiment, the first particles include PBT. Optionally, the first particles can further include inorganics earths such as $CaCO_3$, $SiO_2$, Talcum and/or organic materials such as PMMA, PA6. The first particles may be present in an amount ranging from about 0.5 wt % to about 20 wt %, or about 1 wt % to about 17 wt %, or about 2 wt % to about 15 wt %, or about 8 wt % to about 10 wt %, or about 5 wt % to about 10 wt %, or about 5 wt % to about 8 wt % based on the total weight of the core layer 102.

Figure 1B:
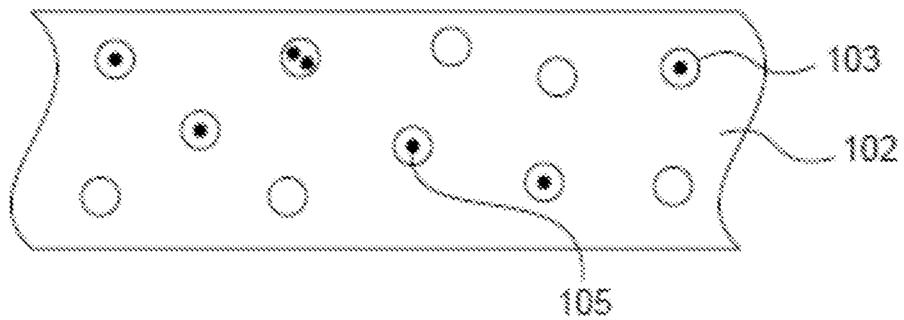
FIG. 1B illustrates a cross-section of a polymer-based core layer in accordance with an embodiment of the present disclosure.

Referring to FIG. 1B, the structure of the polymer-based core layer 102 may be a polymer matrix having voids 103 disposed therein. At least some of the voids 103 are occupied by one or more first particles 105. The polymer and the first particles are present in the polymer-based core layer 102 in a weight ratio ranging from about 80:20 to about 95:5, or about 90:10 to about 95:5. The weight ratio may be adjusted to control mechanical properties of the polymer-based core layer 102. For example, increasing the weight ratio may impart higher tensile strength and consequent a lower yield because more first polymer is used. The average particles size of the first particles may range from about 0.2 μm to about 5 μm, or about 0.2 μm to about 4 μm, about 0.2 μm to about 3 μm, or about 0.2 μm to about 2 μm, or about 0.8 μm to about 3 μm. The average particle size may be adjusted to control the size of the void or cavities created in the layer. For example, a cavitating agent with large average particle size at the same weight ratio can result in very low unit weight (mass per area unit) but also may deteriorate the modulus of the film. In one embodiment, the average particle size of the first particles is sub-micron. The sub-micron average particles size may reduce surface roughness on the first and second surfaces 104, 106 of the polymer-based core layer 102. The reduced surface roughness may advantageously translate to the surface to the surfaces of successive layers, such as intermediate layers or skin layers of the multi-layer film 100 described below.

The core layer 102 may further include other materials, such as migratory slip or other migratory additives known in the art. These additives may include one or more of poly-saturated silicone, stearates such as those including calcium (Ca), zinc (Zn) and/or manganese (Mg), and fluoropolymers. These materials may be present in amount ranging from 0.2 wt % to about 20 wt %, or about 1 wt % to about 17 wt %, or about 2 wt % to about 15 wt %, or about 1 wt % to about 5 wt %, or about 0.2 wt % to about 2 wt %, based on the total weight of the core layer 102.

Returning to FIG. 1A, an intermediate layer 108 is disposed on the first surface 104 of the core layer 102. The intermediate layer 108 may range in thickness from about 0.5 μm to about 8 μm, or about 1 μm to about 6 μm, or about 2 μm to about 4 μm, about 2 μm to about 3 μm, or about 1 μm to about 2 μm.

The intermediate layer 108 comprises a polymer that includes homopolymers or copolymers or terpolymers of polypropylene and/or polypropylene/ethylene and/or polypropylene/ethylene/butylene. The polymer may be present in the intermediate layer 108 in an amount of greater than about 50 wt %, based on the total weight of the core layer. In some embodiments, the polymer may be present in an amount ranging from about 50 wt % to about 100 wt %, or about 70 wt % to about 97 wt %, or about 75 wt % to about 97 wt %, or about 80 wt % to about 97 wt %, or about 85 wt % to about 97 wt %, or about 90 wt % to about 97 wt %, based on the total weight of the intermediate layer. In some embodiments, the intermediate layer 108 includes second particles, for example, such as cavitating agents as discussed with reference to FIG. 1C below. However, an intermediate layer of the present application is not necessarily cavitated. Exemplary second particles include as inorganics earths, such as $CaCO_3$, $SiO_2$, Talcum and/or organic materials, such as PBT, PMMA, PA6. The second particles may be present in an amount ranging from 2 wt % to about 20 wt %, or about 3 wt % to about 17 wt %, or about 5 wt % to about 15 wt %, or about 8 wt % to about 10 wt %, based on the total weight of the intermediate layer 108.

The intermediate layer 108 can act as an adhesive between the polymer-based core layer 102 and another layer. For example, if the polymer-based core layer 102 and another layer are made of different materials having different properties, the polymer-based core layer 102 and the other layer may de-laminate if directly contacted with each other. The intermediate layer 108 may be disposed between the polymer-based core layer 102 and the other layer to form a stronger laminate. Alternative or additional functions of the intermediate layer 104 may include acting as barrier to oils that could penetrate into the core layer 102.

Figure 1C:
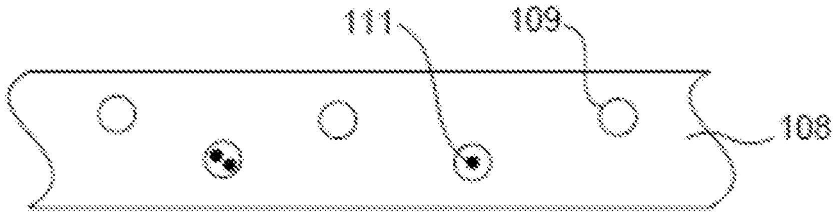
FIG. 1C illustrates a cross-section of an intermediate layer in accordance with an embodiment of the present disclosure.

Referring to FIG. 1C, the structure of the intermediate layer 108 may be a polymer matrix having voids 109 disposed therein. At least some of the voids 109 are occupied by one or more second particles 111. The polymer and the second particles are present in the intermediate layer 108 in a weight ratio ranging from about 80:20 to about 95:5, or about 91:10 to about 95:5. The weight ratio may be adjusted to control mechanical properties of the intermediate layer 108 in a similar manner as described herein for the polymer-based core layer 102. The average particles size of the second particles may range from about 0.2 μm to about 5 μm, or about 0.2 μm to about 4 μm, about 0.2 μm to about 3 μm, or about 0.2 μm to about 5 μm, or about 0.8 μm to about 3 μm The average particle size may be adjusted to control properties of the intermediate layer 108 in a similar manner as described for the polymer-based core layer 102. In one embodiment, the average particle size of the second particles is sub-micron. The sub-micron average particles size may reduce surface roughness of the intermediate layer 108. The reduced surface roughness may advantageously translate to the surfaces of successive layers, such as skin layers described below. FIG. 1C is one embodiment of an intermediate layer. Other embodiments of an intermediate layer may not use second particles.

The intermediate layer 108 may further include other materials, such as pigments which may include $TiO_2$ or rare earth elements to add the opaque effect to the film. These materials may be present in amount ranging from about 1 wt % to about 5 wt %, based on the total weight of the intermediate layer 108.

The cavitation of the intermediate layer 108 can help to alleviate the amount of cavitation needed for the polymer-based core layer 102. Reducing the amount of cavitation needed in the core layer 102 can allowed the polymer-based core layer 102 to retain mechanical properties that can otherwise be lost by cavitation.

Returning to FIG. 1A, a skin layer 110 is disposed on the intermediate layer 108 such that the intermediate layer 108 is arranged between the core layer 102 and the skin layer 110. The skin layer 110 may impart optical properties to the multi-layer film, such as color, and a glossy or matte finish. The skin layer 110 may further be an ink receptive layer, and/or serve as an adhesive for another layer (not illustrated in FIG. 1A) that is an ink receptive layer.

The skin layer may have a thickness ranging up to about 5 microns. In some embodiments, the thickness may range from about 1 micron to about 2 microns, or about 2 to about 2.5 microns. The skin layer may include a polymer, such as homopolymers or copolymers or terpolymers of polypropylene and/or polypropylene/ethylene and/or polypropylene/ethylene/butylene. The polymer may be present in amount ranging from about 50 wt % to about 90 wt % based on the total weight of the skin layer 110. The skin layer may include other materials, such as pigments. These other materials may be present in the skin layer 110 in an amount ranging from about 1 wt % to about 10 wt % based on the total weight of the skin layer 110. In some embodiments, the skin layer 110 can further include a sealable layer (not shown in FIG. 1A). The sealable layer can be used to generate a heat seal initiation temperature of 75 degrees Celsius or higher, 85 degrees Celsius or higher, 95 degrees Celsius or higher, 105 degrees Celsius or higher, or 130 degrees Celsius or higher. The sealing forces may be greater than 500 grams/inch.

The multi-layer film 100 includes a second intermediate layer 112 disposed on the second surface 106 of the polymer-based core layer 102. The second intermediate layer 112 may have the same composition, dimensions, and/or function of the intermediate layer 108, or may be different from the intermediate layer 108 in one or more aspects. For example, different skin layers may require different intermediate or tie layers. The second intermediate layer 112 can be an optional layer and may not be present in some applications.

A second skin layer 114 is disposed on the second intermediate layer 112 such that the second intermediate layer 112 is arranged between the polymer-based core layer 102 and the second skin layer 114. The second skin layer 114 may have the same composition, dimensions, and/or function of the skin layer 110, or may be different from the skin layer 110 in one or more aspects. In one embodiment, such when the multi-layer film is used in a label application, the skin layer 110 may be utilized as an ink receptive surface and the second skin layer 114 may be utilized as an adhesive layer to bond the multi-layer film to an object, or alternative as a layer that is receptive to an adhesive film, where the adhesive film bonds the multi-layer film 100 to the object.

Figure 1D:
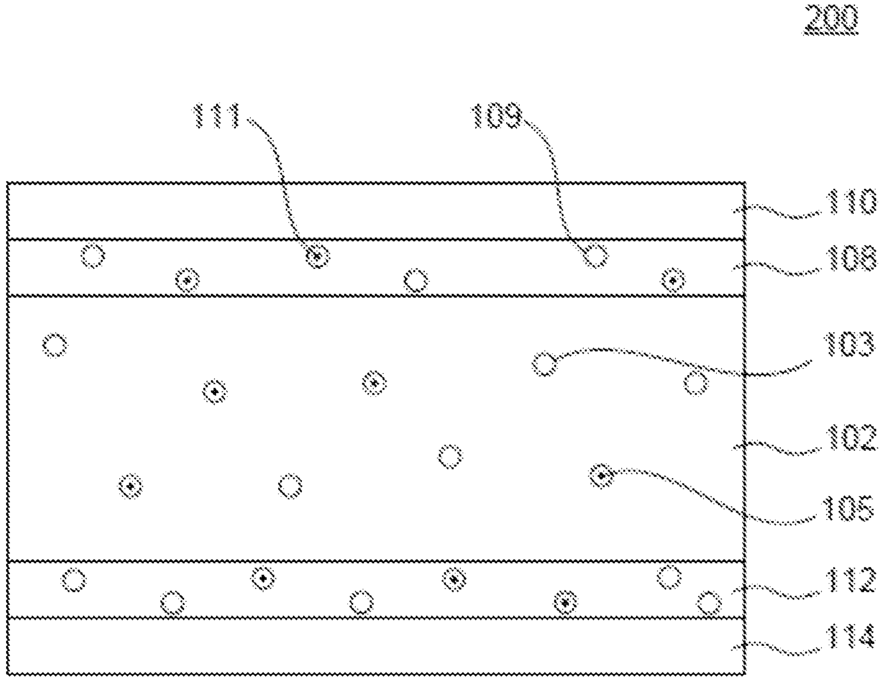
FIG. 1D illustrates a cross-section of a multi-layer film in accordance with an embodiment of the present disclosure.

FIG. 1D illustrates a multi-layer film 200 in accordance with an embodiment of the present disclosure. The multi-layer film 200 includes the core layer 102, intermediate layers 108, 112, and skin layers 110, 114 as arranged in the multi-layer film 100. In the multi-layer film 200, each of the core layer, intermediate layer 108, and intermediate layer 112 are cavitated. For example, if it was desired to have optical appearance on both sides of the film 200, both intermediate layers may be cavitated.

Figure 1E:
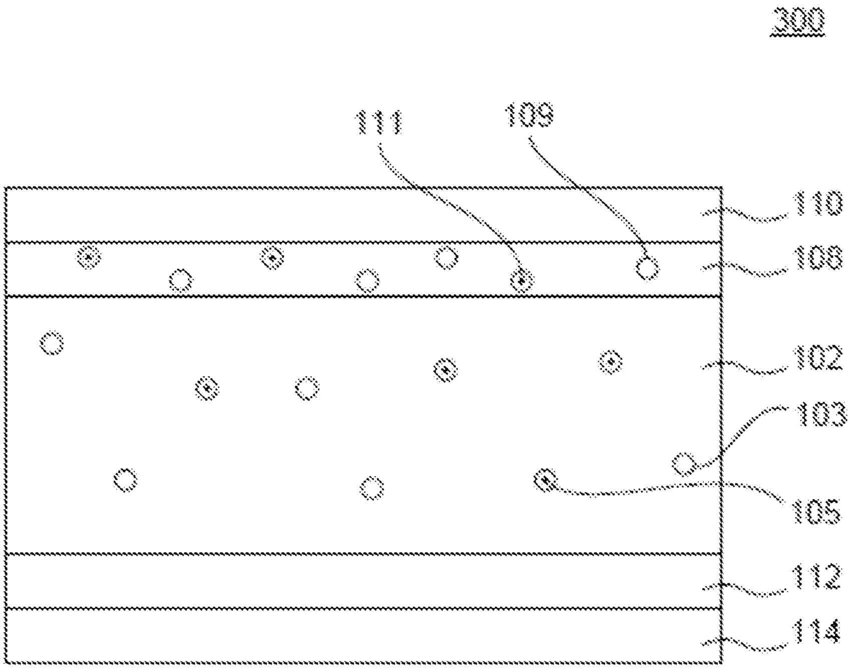
FIG. 1E illustrates a cross-section of a multi-layer film in accordance with an embodiment of the present disclosure.

FIG. 1E illustrates a multi-layer film 300 in accordance with an embodiment of the present disclosure. The multi-layer film 300 includes the core layer 102, intermediate layers 108, 112, and skin layers 110, 114 as arranged in the multi-layer film 100. In the multi-layer film 200, each of the core layer and the intermediate layer 108 are cavitated, but the intermediate layer 112 is not cavitated. For example, when the optical appearance on only one side is important it would not be necessary to cavitate intermediate layer 112.

Although disclosed herein as a multi-layer film having a core layer 102, intermediate layers 108,112, and skin layers 112, 114, other multi-layer films are possible, for example, such as a multi-layer film having a core layer and different combinations of intermediate and/or skin layers, such as films having less than five layers or more than five layers. Additional embodiments of a multi-layer film are disclosed in U.S. application Ser. No. 16/427,995, assigned to Inter-plast Group Corporation, the entire contents of which is incorporated by reference herein.

The method of making a multi-layer film described herein is not limiting. One exemplary method of forming the multi-layer film is by coextruding the layers of the multi-layer film. Coextruding processes are well understood in the industry and the coextruded multi-layer film can be cooled on a drum whose surface temperature is controlled to, for example, between 20° C. and 60° C. to solidify the multi-layer film. The multi-layer film is stretched in the longitudinal direction at about 135° C. to 165° C. at a stretching ratio of, for example, about 4 to about 6 times the original length. The stretched multi-layer film is cooled to about 70° C. to 120° C. to obtain a uniaxially oriented multi-layer film. The uniaxially oriented sheet is introduced into a tenter and heated to between 130° C. and 180° C. It is stretched in the transverse direction at a stretching ratio of, for example, about 7 to about 10 times the original length. The multi-layer film is then heat-set or annealed to reduce internal stresses, minimize shrinkage, and yield a thermally stable biaxially oriented multi-layer film.

A final step in the production of the BOPP film may be to pass the film through several rollers to ensure the film is wound flat without wrinkles. During the pass of the film through these rollers the surface energy of either one or both most exterior layers can be modified by surface treatment. This is achieved using different techniques known in art, which include one or several methods. Those methods include, but not limited to, corona discharge, flame treatment, polarized flame treatment, and/or atmospheric plasma treatment. Using these methods the surface energy is increased by creating polar groups that ensures that the films be receptive to coating, printing inks, adhesives, metal deposition or lamination to other films.

Example

A multi-layer BOPP film having, in order, a first skin layer, a first intermediate layer, a core layer, a second intermediate layer, and a second skin layer is co-extruded using cast film line. The overall thickness of the multi-layer BOPP film is about 38 μm, where the core layer is about 31 μm, the first and second intermediate layers are about 2 μm, and the first and second skin layers are about 1.5 μm. The core layer was prepared by including about 7 wt % of PBT particles as a cavitating agent. Opacity of the film was about 85 as measured by Tappi T425. The film had excellent high z tear interfacial force.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A multi-layer film, comprising:

a core layer having a first side and a second side opposite the first side, wherein the core layer comprises a polymer;

a first intermediate layer disposed on the first side of the core layer;

a second intermediate layer disposed on the second side of the core layer;

a first skin layer disposed on the first intermediate layer and arranged such that the first intermediate layer is disposed between the core layer and the first skin layer; and a second skin layer disposed on the second intermediate layer and arranged such that the second intermediate layer is disposed between the core layer and the second skin layer, wherein the core layer has a thickness that is greater than thickness of the first or the second intermediate layers or the skin layer, wherein the core layer includes polybutylene terephthalate (PBT) particles disposed therein, wherein the amount of PBT particles ranges from about 1 to about 10 percent by weight (wt %), based on the total weight of the core layer, wherein the PBT particles have an average particle size from 2 μm to less than 4 μm, wherein the multi-layer film has a thickness ranging from about 28 microns to about 38 microns, wherein the core layer has a thickness ranging from about 20 microns to about 29 microns, and wherein the multi-layer film has a first surface having a gloss ranging from about 60 to about 80, where the gloss is measured by ASTM D2457 at an angle of 45°, and wherein the multi-layer film has a Z tear interfacial layer force in a range from about 422 g/in to about 1180 g/in.

2. The multi-layer film of claim 1, wherein the multi-layer film has a thickness ranging from about 35 microns to about 38 microns.

3. The multi-layer film of claim 1, wherein the core layer has a thickness ranging from about 28 microns to about 29 microns.

4. The multi-layer film of claim 1, wherein the first and second intermediate layers have thicknesses ranging from about 1 μm to about 5 μm.

5. The multi-layer film of claim 1, wherein the first and second skin layers have thicknesses ranging from about 1 μm to about 4 μm.

6. The multi-layer film of claim 1, wherein the multi-layer film has a second surface having a gloss ranging from about 60 to about 77, where the gloss is measured by ASTM D2457 at an angle of 45°.

7. The multi-layer film of claim 1, wherein the multi-layer film has an opacity ranging from about 80 to about 92, wherein the opacity is measured by TAPPI T425.

8. The multi-layer film of claim 1, wherein the first and second skin layer are either flame or corona treated or both.

9. The multi-layer film of claim 1, wherein the core layer further comprises an additive, where the additive is one or more of a stearate including calcium (Ca), a stearate including zinc (Zn), a stearate including manganese (Mg), or fluoropolymers.

10. The multi-layer film of claim 9, wherein the additive is included in amount of about 0.2 wt % to about 2 wt %, based on the total weight of the core layer.

11. The multi-layer film of claim 1, wherein the first and second skin layers each include a sealing layer, wherein the sealing layer is capable of generating a heat seal initiation temperature of 75° C. or more, and wherein the multi-layer film has a thickness ranging from 28 microns to about 30 microns.

12. The multi-layer film of claim 1, wherein the core layer further comprises:

a polymer matrix having voids disposed therein, and wherein at least some of the voids are occupied by one or more PBT particles.

13. A label, comprising:

the multi-layer film of claim 1; and an adhesive layer.

14. The label of claim 13, wherein the multi-layer film has a thickness ranging from about 35 microns to about 38 microns.

15. The label of claim 13, wherein the core layer has a thickness ranging from about 28 microns to about 29 microns.

16. The label of claim 13, wherein the first and second intermediate layers have thicknesses ranging from about 1 μm to about 5 μm.

17. The label of claim 13, wherein the first and second skin layers have thicknesses ranging from about 1 μm to about 4 μm.

18. The label of claim 13, wherein the first surface has a gloss ranging from about 60 to about 77 and the multi-layer film has a second surface having a gloss ranging from about 75 to about 80, where the gloss is measured by ASTM D2457 at an angle of 45°.

19. The label of claim 13, wherein the multi-layer film has an opacity ranging from about 80 to about 92, wherein the opacity is measured by TAPPI T425.

20. The label of claim 13, wherein the core layer further comprises an additive, where the additive is one or more of a stearate including calcium (Ca), a stearate including zinc (Zn), a stearate including manganese (Mg), or fluoropolymers.

* * * * *